(12) United States Patent
Manabe et al.

(10) Patent No.: US 10,962,401 B2
(45) Date of Patent: Mar. 30, 2021

(54) FUEL LEVEL DETECTION DEVICE

(71) Applicant: AISAN KOGYO KABUSHIKI KAISHA, Obu (JP)

(72) Inventors: Yuichi Manabe, Inazawa (JP); Nobuo Suzuki, Obu (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 231 days.

(21) Appl. No.: 16/309,680

(22) PCT Filed: Mar. 15, 2017

(86) PCT No.: PCT/JP2017/010484
§ 371 (c)(1),
(2) Date: Dec. 13, 2018

(87) PCT Pub. No.: WO2017/217048
PCT Pub. Date: Dec. 21, 2017

(65) Prior Publication Data
US 2019/0170561 A1 Jun. 6, 2019

(30) Foreign Application Priority Data

Jun. 14, 2016 (JP) .............................. JP2016-118030

(51) Int. Cl.
*G01F 23/32* (2006.01)
*G01F 23/38* (2006.01)

(52) U.S. Cl.
CPC .............. *G01F 23/38* (2013.01); *G01F 23/32* (2013.01)

(58) Field of Classification Search
CPC ............................................. G01F 23/30–38
See application file for complete search history.

(56) References Cited

U.S. PATENT DOCUMENTS 7,536,989 B2 * 5/2009 Tomoyuki .............. B60K 15/03
123/198 E
9,645,005 B2  5/2017 Go et al.
(Continued)

FOREIGN PATENT DOCUMENTS

CN  202793520 U  3/2013
JP  2013-096754 A  5/2013
(Continued)

OTHER PUBLICATIONS

International Search Report (ISR) for PCT/JP2017/010484 dated Jun. 13, 2017 with English Translation (4 pages).
(Continued)

*Primary Examiner* — Justin N Olamit
(74) *Attorney, Agent, or Firm* — Shumaker, Loop & Kendrick, LLP

(57) ABSTRACT

A liquid fuel level sensing device disclosed herein may include: a holder; an arm fixed to the holder; a cover fixed to the holder to cover the arm; and a float connected to the arm outside the holder. The holder may include a bottom portion and a first snap fit structure, which may include a pair of support portions provided with an interval therebetween, and provided on the bottom portion. First and second interval portions may be provided between the pair of support portions, the first interval portion may hold the arm, and the second interval portion may be provided above the first interval portion and be narrower than a width of the arm held in the first interval portion. The cover may include a deformation restricting portion provided at a position facing an outer surface of at least one of the pair of support portions.

6 Claims, 4 Drawing Sheets

(56) References Cited

U.S. PATENT DOCUMENTS

| | | |
|---|---|---|
| 9,810,570 B2 | 11/2017 | Iryo et al. |
| 2005/0103103 A1 | 5/2005 | Newman et al. |
| 2016/0109279 A1 | 4/2016 | O'Neill |

FOREIGN PATENT DOCUMENTS

| | | |
|---|---|---|
| JP | 2013-242174 A | 12/2013 |
| JP | 2015-102501 A | 6/2015 |
| JP | 2015-210153 A | 11/2015 |

OTHER PUBLICATIONS

Written Opinion for PCT/JP2017/010484 dated Jun. 13, 2017 with English Translation (7 pages).
Chinese Office Action ("CN OA") for CN 201780036314.9 dated Nov. 15, 2019 (12 pages including English translation).

\* cited by examiner

FUEL LEVEL DETECTION DEVICE

TECHNICAL FIELD

The technique disclosed in the description herein relates to a liquid fuel level sensing device configured to sense a level of liquid fuel in a fuel tank.

BACKGROUND ART

Japanese Patent Application Publication No. 2013-242174 describes a liquid fuel level sensing device provided with a body (a body part), a holder, an arm, a cover, and a float. The body is configured to be fixed in a fuel tank. The holder is rotatably supported by the body. The arm is fixed to the holder. The cover is fixed to the holder so as to cover the arm. A part of the arm extends externally from the holder. The float is connected to the arm outside the holder. The float floats on fuel in the fuel tank. As a liquid level of the fuel changes, the float moves up and down. When this happens, the arm rotates with respect to the body together with the cover and the holder. The liquid level of the fuel is sensed by sensing a rotation angle of the arm.

SUMMARY OF INVENTION

Technical Problem

In the liquid fuel level sensing device of Japanese Patent Application Publication No. 2013-242174, the arm is fixed to the holder by a snap-fit structure. The snap-fit structure in the description herein means a structure that in a course of pressing one member against another member, a part of the other member is elastically deformed, and when the one member is pressed against the other member to a predetermined position, the deformed part is restored to its original shape, by which the both members are fixed to each other at the position. By using the snap-fit structure, the arm can be easily fixed to the holder and assembly of the liquid fuel level sensing device can be facilitated.

While a liquid fuel level sensing device is used, retaining force of a snap-fit structure may decrease in some cases. For example, the retaining force of the snap-fit structure may decrease due to a temperature change in a fuel tank. Further, since a holder is immersed in fuel, the retaining force of the snap-fit structure may decrease due to the snap-fit structure expanding by absorbing the fuel. Due to this, there is a risk that an arm may be detached from the snap-fit structure by vibration or impact being applied thereto during use of the liquid fuel level sensing device. The snap-fit structure may be prepared with an increased hardness in advance to increase its retaining force by taking the decrease in the retaining force of the snap-fit structure into consideration. However, when the snap-fit structure has such an increased hardness, flexibility of the snap-fit structure decreases, and thus assembling efficiency of the liquid fuel level sensing device declines. Further, when the flexibility of the snap-fit structure decreases, the snap-fit structure may be plastically deformed in assembling the liquid fuel level sensing device, and thus its retaining force may decrease at an extreme degree.

In view of the above, the description herein provides a novel technique capable of suppressing a decrease in retaining force of a snap-fit structure while maintaining flexibility of the snap-fit structure.

Solution to Technical Problem

A liquid fuel level sensing device disclosed in the description herein may be configured to sense a level of liquid fuel in a fuel tank. This fuel level sensing device may comprise a body configured to be fixed in the fuel tank; a holder rotatably supported by the body; an arm fixed to the holder; a cover fixed to the holder so as to cover the arm; and a float connected to the arm outside the holder. The holder may comprise a bottom portion and a first snap fit structure. The first snap fit structure may comprise a pair of support portions provided with an interval therebetween, and the pair of support portions may be provided on the bottom portion. A first interval portion and a second interval portion may be provided between the pair of support portions, the first interval portion may hold the arm, the second interval portion may be provided above the first interval portion, and the second interval portion may be narrower than a width of the arm held in the first interval portion. The cover may comprise a deformation restricting portion provided at a position facing an outer surface of at least one of the pair of support portions.

The aforementioned expression "above the first interval portion" means a side separating away from the bottom portion relative to the first interval portion (a distal end side of the support portions). Further, the aforementioned expression "outer surface" means an opposite surface to a surface on the side where the interval portions (the first interval portion and the second interval portion) between the pair of support portions are provided.

In this liquid fuel level sensing device, when force acts on the arm, due to vibration or impact, in a direction along which the arm is detached from the first snap fit structure (that is, in a direction separating from the bottom portion), the arm comes to contact the pair of support portions in the narrow second interval portion. When this happens, force is applied to the pair of support portions in a direction expanding the second interval portion. When at least one of the pair of support portions is deformed by this force in the direction expanding the second interval portion, the at least one of the support portions comes to contact the deformation restricting portion of the cover. Due to this, a width of the second interval portion is prevented from further broadening, and the arm is prevented from being detached from the first snap fit structure. With this configuration, deformation of at least one of the support portions can be restricted by the support portion(s) physically contacting the deformation restricting portion, and thus retaining force of the first snap fit structure is less likely to decrease over time. Further, according to this configuration, the decrease in the retaining force of the first snap fit structure can be suppressed while flexibility thereof is maintained.

DESCRIPTION OF EMBODIMENT

Some of the features characteristic to below-described embodiment will herein be listed. It should be noted that the respective technical elements are independent of one another, and are useful solely or in combinations.

(Feature 1) The cover comprises a through hole, and the first snap fit structure is inserted in the through hole. According to this configuration, an inner surface of the through hole functions as the deformation restricting portion. Further, according to this configuration, the snap fit structure can be seen from outside of the cover, and thus assembly of the liquid fuel level sensing device can be facilitated.

(Feature 2) The cover and the holder comprise a second snap fit structure configured to fix the cover and the holder to each other. According to this configuration, the cover can be fixed to the holder easily. Further, when force acts on the arm in a direction along which the arm is detached from the first snap fit structure, force acts on the cover in a direction along which the cover is detached from the holder. Due to this, the force acts on the second snap fit structure. However, the force from the arm is not applied directly to the second snap fit structure, and thus the force applied to the second snap fit structure is not so large. Due to this, detachment of the second snap fit structure can be suppressed.

Embodiment

Figure 1:
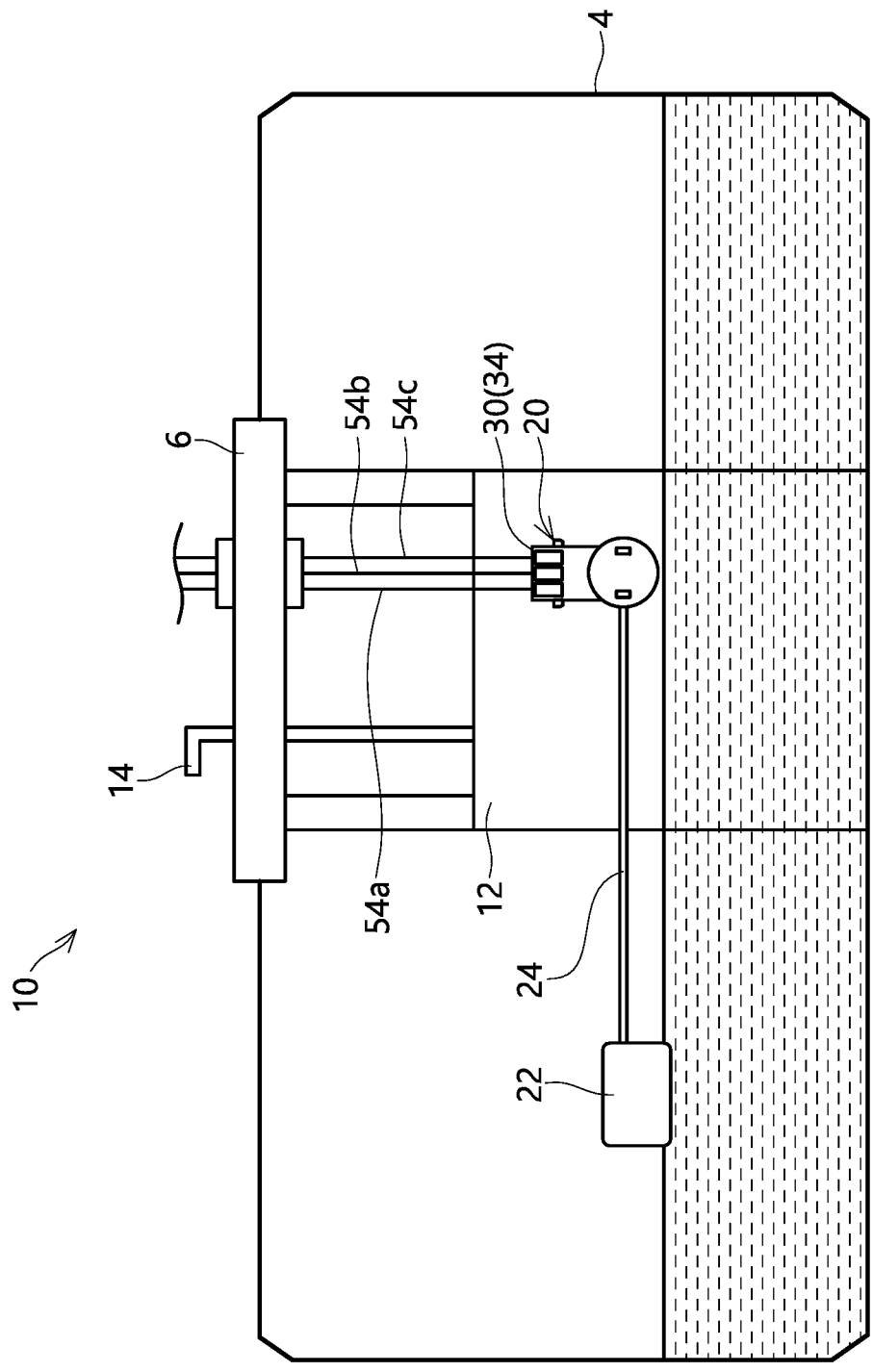
FIG. 1 shows a configuration of a fuel pump module of an embodiment.

A fuel pump module 10 shown in FIG. 1 is a unit for supplying fuel in a fuel tank 4 of a vehicle, such as an automobile, to an engine which is not shown.

The fuel pump module 10 includes a fuel pump unit 12 and a liquid fuel level sensing device 20. The fuel pump unit 12 is housed in the fuel tank 4. The fuel pump unit 12 is attached to a set plate 6 that closes an opening of the fuel tank 4. The fuel pump unit 12 is configured to suction the fuel in the fuel tank 4 into the fuel pump unit 12, increase a pressure thereof, and discharge it to outside of the fuel pump unit 12. The fuel discharged from the fuel pump unit 12 is supplied to the engine, which is not shown, from a discharge port 14.

The liquid fuel level sensing device 20 includes a float 22, an arm 24, a magnetic sensor unit 30, and electric wires 54a to 54c. The float 22 floats on the fuel in the fuel tank 4 and moves in an up-down direction according to a liquid level of the fuel. The float 22 is rotatably attached to a distal end of the arm 24. A base end of the arm 24 is rotatably supported by the magnetic sensor unit 30. When the float 22 moves up and down according to the liquid level of the fuel in the fuel tank 4, the arm 24 pivotally rotates with respect to the fuel pump unit 12. That is, the arm 24 converts the up-and-down motion of the float 22 to rotary motion. The arm 24 is constituted of metal having tolerance against fuel, such as stainless, and has a cylindrical bar shape.

The magnetic sensor unit 30 rotatably supports the arm 24. The magnetic sensor unit 30 is configured to sense a rotation angle of the arm 24. As shown in FIGS. 2 to 5, the magnetic sensor unit 30 includes a body 34, a holder 36, a cover 38, and a permanent magnet 44. FIGS. 2 to 5 omit the float 22 and a part of the arm 24 on a float 22 side. Further, in FIG. 5, a cross section of the holder 36 is crosshatched, and a cross section of the cover 38 is dot-hatched.

Figure 3:
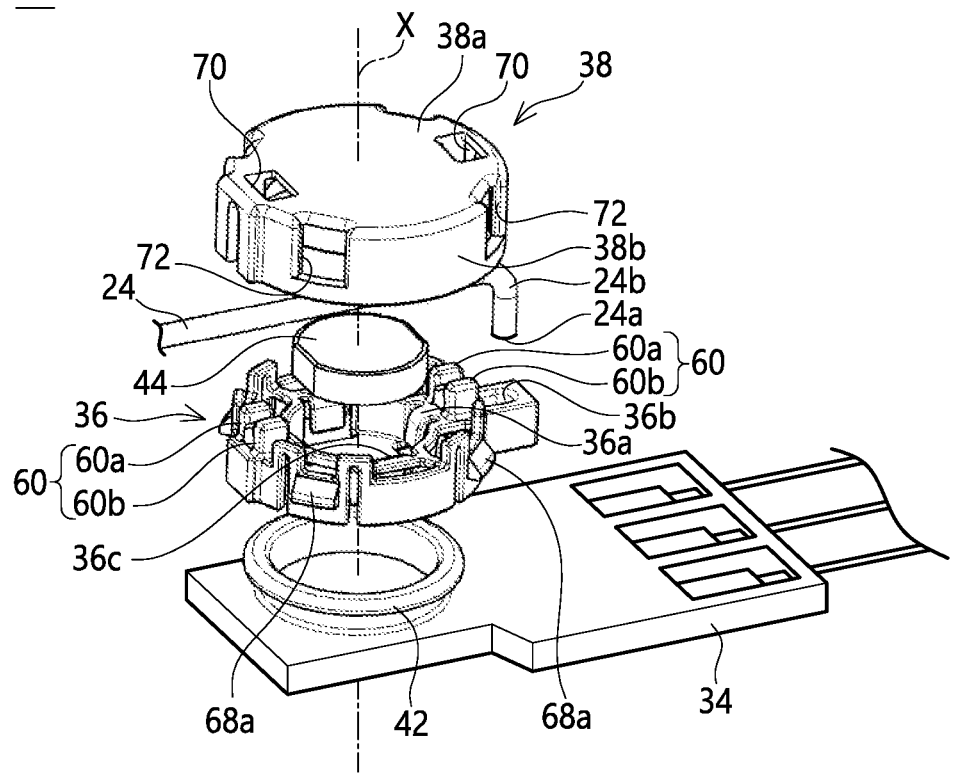
FIG. 3 shows an exploded perspective view of the magnetic sensor unit of the embodiment.
Figure 5:
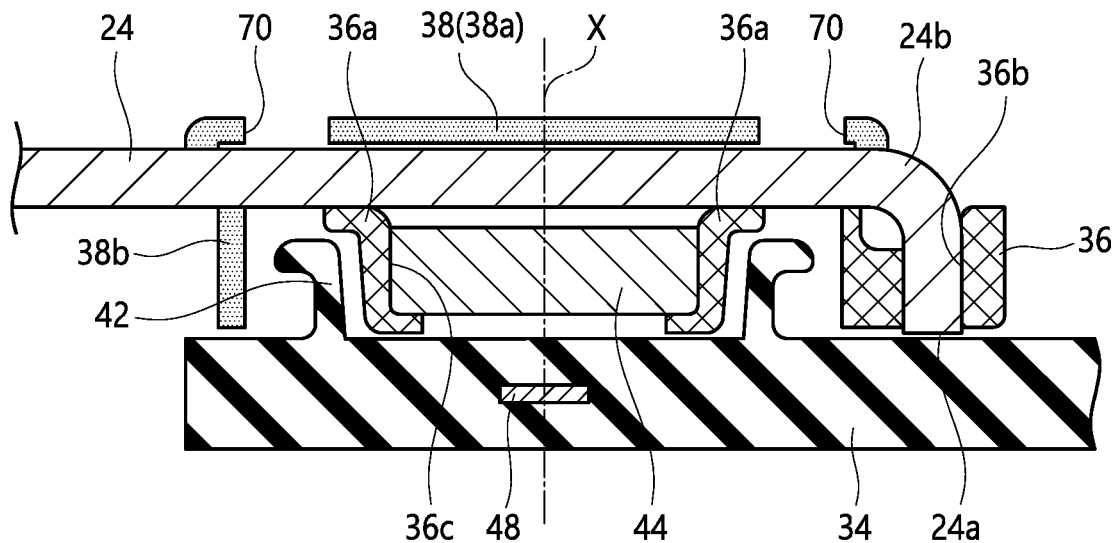
FIG. 5 shows a cross sectional view along a line V-V in FIGS. 2 and 4.

As shown in FIG. 1, the body 34 is fixed to an outer wall of the fuel pump unit 12. The body 34 is constituted of resin. As shown in FIGS. 3 and 5, the body 34 includes a cylinder portion 42. The cylinder portion 42 has a cylindrical shape of which central axis is a rotary axis X of the arm 24. The holder 36 is attached to the cylinder portion 42.

As shown in FIG. 5, the body 34 houses a liquid fuel level sensor 48. The liquid fuel level sensor 48 is disposed on the rotary axis X. The liquid fuel level sensor 48 is Hall element constituted of a semiconductor chip. The liquid fuel level sensor 48 is configured to sense a direction of magnetic field passing therethrough. The liquid fuel level sensor 48 may be constituted of another magnetic sensing element, such as an MRE (Magnet Resistive Element). The liquid fuel level sensor 48 is connected to the electric wires 54a to 54c shown in FIG. 1 by wiring which is not shown. The liquid fuel level sensor 48 outputs to the terminal 54b a signal indicating a direction of magnetic field passing therethrough. The output signal from the liquid fuel level sensor 48 is sent to a fuel meter outside the fuel tank 4.

Figure 2:
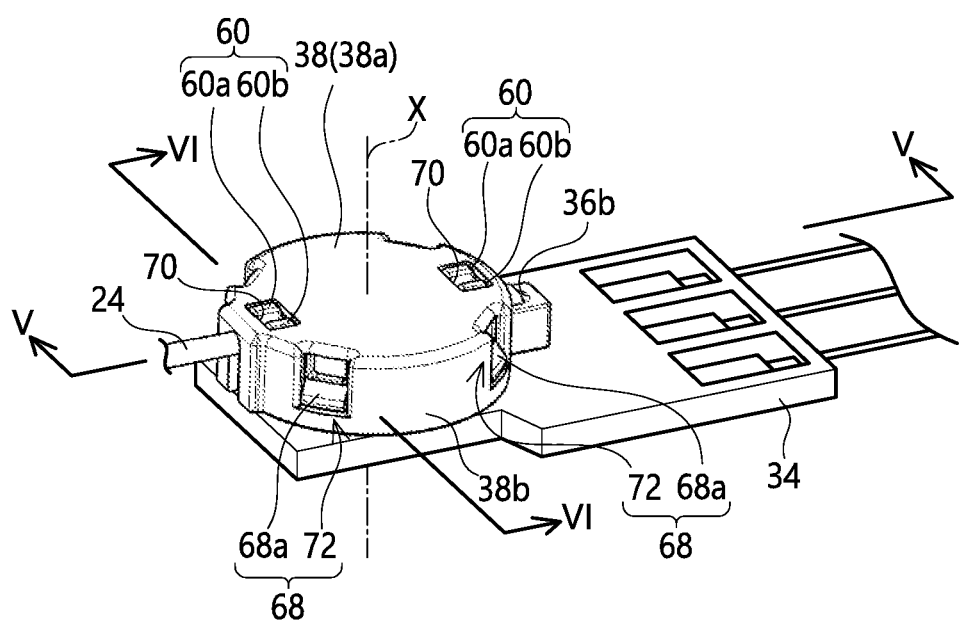
FIG. 2 shows a perspective view of a magnetic sensor unit of the embodiment.
Figure 4:
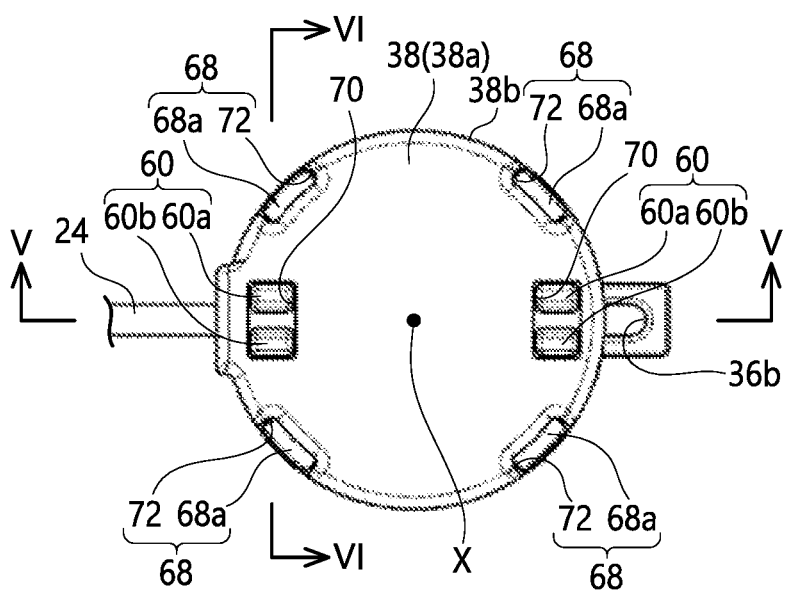
FIG. 4 shows a plan view of a rotary portion of the magnetic sensor unit of the embodiment.

The holder 36 is rotatably supported by the cylinder portion 42 of the body 34. The holder 36 can rotate about the rotary axis X with respect to the body 34. As shown in FIGS. 2 to 4, the holder 36 includes first snap fit structures 60 configured to retain the arm 24. The holder 36 further includes an accommodation hole 36b for accommodating the base end of the arm 24. The holder 36 further includes second snap fit structures 68 (more specifically, protrusions 68a constituting a part of the second snap fit structures 68) configured to fix the cover 38.

Figure 6:
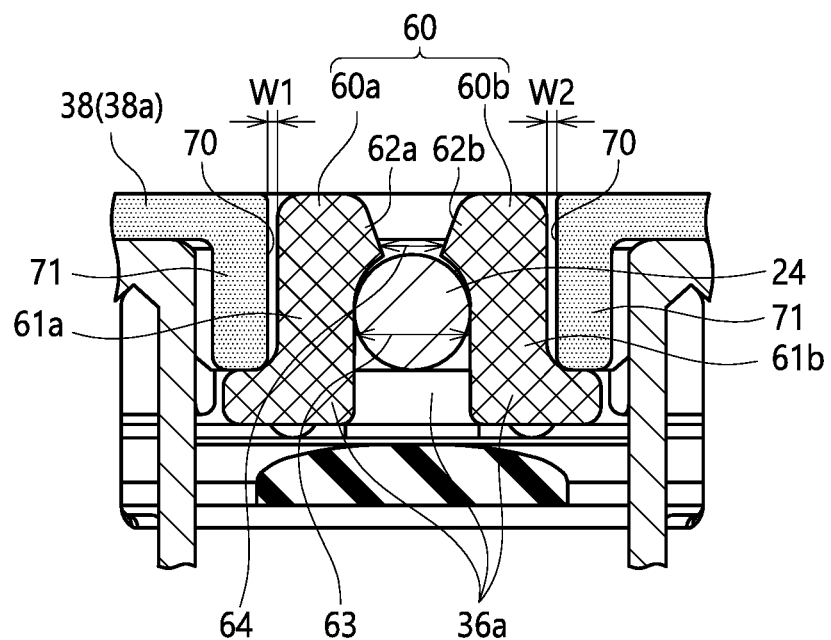
FIG. 6 shows a cross sectional view along a line VI-VI in FIGS. 2 and 4.

As shown in FIGS. 3 and 5, the arm 24 is bent in an L-shape at a bent portion 24b which is near a base end 24a on an opposite side to the float 22. A portion of the arm 24 that is located on a base end 24a side relative to the bent portion 24b is inserted in the accommodation hole 36b of the holder 36. As shown in FIG. 5, a main portion of the arm 24 (a portion thereof on a float 22 side relative to the bent portion 24b) is disposed on a bottom portion 36a of the holder 36. As shown in FIGS. 4 and 6, two first snap fit structures 60 are provided on the bottom portion 36a. Each of the first snap fit structures 60 is constituted of a pair of support portions 60a, 60b. Since the first snap fit structures 60 have a substantially identical structure, one of the first snap fit structures 60 on a line VI-VI side in FIGS. 2 and 4 will be described hereinbelow. As shown in FIG. 6, the support portions 60a, 60b extend upward from the bottom portion 36a. The expression "upward" herein means a direction from the bottom portion 36a toward the arm 24 on a surface where the bottom portion 36a and the arm 24 are in contact with each other. The term "up" will be used similarly hereinbelow. The support portions 60a, 60b respectively include pillar portions 61a, 61b extending from the bottom portion 36a and hooks 62a, 62b provided at upper ends of the pillar portions 61a, 61b. An interval is provided between the pillar portion 61a and the pillar portion 61b. Hereinbelow, the interval between the pillar portion 61a and the pillar portion 61b will be termed a first interval portion 63. The hooks 62a, 62b are provided at the upper ends of the pillar portions 61a, 61b. The hook 62a is provided on an inner surface (a surface on an interval portion side) of the support portion 60a. The hook 62a protrudes toward a support portion 60b side than the pillar portion 61a. The hook 62b is provided on an inner surface (a surface on the interval portion side) of the support portion 60b. The hook 62b protrudes toward a support portion 60a side than the pillar portion 61b. The hook 62a and the hook 62b face each other. An interval is provided between the hook 62a and the hook 62b. Hereinbelow, the interval between the hook 62a and the hook 62b will be termed a second interval portion 64. The second interval portion 64 is located above the first interval portion 63. A width of the second interval portion 64 is narrower than a width of the first interval portion 63. The first interval portion 63 holds the arm 24. The width of the first interval portion 63 is same as a width (a diameter) of the arm 24, or is slightly broader than that.

The width of the second interval portion 64 is narrower than the width (the diameter) of the arm 24. Due to this, the hook 62a and the hook 62b are in contact with the arm 24 from its upper side. The arm 24 is retained in a state of being surrounded by the hooks 62a, 62b, the pillar portions 61a, 61b, and the bottom portion 36a. Due to this, the arm 24 is fixed to the holder 36 in the first snap fit structure 60. The arm 24 is fixed as above in each of the two first snap fit structures 60 of the holder 36. Since the arm 24 is fixed to the holder 36 as such, the arm 24 can rotate about the rotary axis X together with the holder 36.

When the arm 24 is to be attached to the holder 36 in a manufacturing process of the liquid fuel level sensing device 20, firstly, the base end 24a of the arm 24 is inserted to the accommodation hole 36b. Next, the arm 24 is pressed toward the bottom portion 36a from the upper side of the hooks 62a, 62b. In doing so, the arm 24 comes to contact the hooks 62a, 62b, and the support portions 60a, 60b are pressed by the arm 24. Then, the support portions 60a, 60b (more specifically, the pillar portions 61a, 61b) are deformed in a direction along which the support portions 60a, 60b separate from each other, by which the width of the second interval portion 64 is broadened. Due to this, the arm 24 enters inside the second interval portion 64. When the arm 24 is further moved toward a bottom portion 36a side, the arm 24 enters inside the first interval portion 63. Then, the support portions 60a, 60b return to their original positions (orientations), and the width of the second interval portion 64 becomes narrow. As such, the arm 24 is fixed in each of the first snap fit structures 60 as shown in FIG. 6.

As shown in FIGS. 3 and 5, a recess 36c is provided at a center of the holder 36. The permanent magnet 44 is fixed to the holder 36 in the recess 36c. Due to this, when the arm 24 rotates, the permanent magnet 44 rotates about the rotary axis X. The permanent magnet 44 includes a south pole and a north pole which are polarized in a direction orthogonal to the rotary axis X. When the permanent magnet 44 rotates about the rotary axis X, a direction of magnetic field passing the liquid fuel level sensor 48 shown in FIG. 5 changes. Therefore, the output signal from the liquid fuel level sensor 48 changes according to a rotation angle of the permanent magnet 44. The rotation angle of the permanent magnet 44 represents the rotation angle of the arm 24. Further, the rotation angle of the arm 24 corresponds to a position of the float 22 in the up-down direction (that is, the liquid level of the fuel). Therefore, the output signal from the liquid fuel level sensor 48 represents the liquid level of the fuel.

As shown in FIGS. 2 to 4, four protrusions 68a are provided on an outer circumferential surface of the holder 36.

The cover 38 is fixed to the holder 36. The cover 38 includes a top plate 38a and a side wall 38b extending downward from the top plate 38a. The top plate 38a has a flat plate shape and covers an upper portion of the holder 36. The arm 24 is disposed between the top plate 38a and the holder 36. The side wall 38b has a cylindrical shape and covers the outer circumferential surface of the holder 36.

The top plate 38a is provided with two through holes 70. Each of the through holes 70 penetrates the top plate 38a from its upper surface to its lower surface. Each of the through holes 70 has a rectangular shape. As shown in FIG. 6, a restricting wall 71 extending downward from the top plate 38a is provided along a contour of each through hole 70. An upper end portion of each first snap fit structure 60 (that is, upper end portions of the support portion 60a and the support portion 60b) is inserted in its corresponding through hole 70. A part of the restricting wall 71 is arranged at a position facing a surface of the support portion 60a on the opposite side to the interval portions 63, 64. Another part of the restricting wall 71 is arranged at a position facing a surface of the support portion 60b on the opposite side to the interval portions 63, 64. An interval W1 between the restricting wall 71 and the support portion 60a, and an interval W2 between the restricting wall 71 and the support portion 60b are extremely narrow. More specifically, the interval W1 is narrower than a half of a difference between the diameter of the arm 24 and the width of the second interval portion 64. Further, the interval W2 is narrower than the half of the difference between the diameter of the arm 24 and the width of the second interval portion 64. Therefore, in a state where the cover 38 is attached, the width of the second interval portion 64 does not become broader than the diameter of the arm 24 even when the support portions 60a, 60b are deformed to positions where they contact the restricting wall 71. The restricting wall 71 prevents the arm 24 from being detached from the first snap fit structures 60 by restricting deformation of the support portions 60a, 60b.

As shown in FIGS. 2 to 4, the side wall 38b is provided with four through holes 72. Each of the through holes 72 penetrates the side wall 38b from its outer circumferential surface to its inner circumferential surface. Each of the through holes 72 has a rectangular shape. Each protrusion 68a of the holder 36 is inserted in its corresponding through hole 72. In the through holes 72, the protrusions 68a are in contact with the side wall 38b of the cover 38 from the upper side. Due to this, the cover 38 is fixed to the holder 36. The second snap fit structures 68 are constituted of the through holes 72 of the cover 38 and the protrusions 68a of the holder 36.

When the cover 38 is to be attached to the holder 36 in a manufacturing process of the liquid fuel level sensing device 20, the cover 38 is pressed toward the holder 36 in a state where the holder 36 is housed inside the cover 38. At this occasion, positions of the protrusions 68a of the holder 36 are aligned with positions of the corresponding through holes 72 of the cover 38. When the cover 38 is pressed toward the holder 36, the protrusions 68a of the holder 36 come to contact the inner circumferential surface of the side wall 38b (more specifically, portions of the side wall 38b located under the through holes 72) of the cover 38. When the cover 38 is continued to be moved toward the holder 36, the protrusions 68a slide on the inner circumferential surface of the side wall 38b. At this occasion, the protrusions 68a are deformed inward. Due to this, the cover 38 can be further moved toward the holder 36. When the cover 38 is further moved toward the holder 36, the protrusions 68a are inserted in the through holes 72. When this happens, the protrusions 68a return to their original orientations. Due to this, the protrusions 68a are in contact with the side wall 38b from the upper side in the through holes 72. Accordingly, the cover 38 is fixed to the holder 36. Further, by attaching the cover 38 as above, the restricting wall 71 of the cover 38 is inserted so as to face the support portions 60a, 60b, as shown in FIG. 6.

While the liquid fuel level sensing device 20 is used, force may be applied to the arm 24, due to application of vibration or impact, in a direction along which the arm 24 is detached from the first snap fit structures 60. That is, in FIG. 6, force may be applied to the arm 24 in a direction from the first interval portion 63 toward the second interval portion 64. When such force is applied to the arm 24, force is applied to the hooks 62a, 62b in a direction expanding the second interval portion 64. Due to this, the support portions 60a, 60b attempt to deformed in the direction expanding the second interval portion. However, the restricting wall 71 of the cover 38 is arranged at the positions facing the surfaces of support portions 60a, 60b on the opposite side to the hooks 62a, 62b. Due to this, when the support portions 60a, 60b are slightly deformed, the support portions 60a, 60b contact the restricting wall 71. Therefore, further deformation of the support portions 60a, 60b can be prevented. Accordingly, expansion of the second interval portion 64 can be prevented, and detachment of the arm 24 from the first snap fit structures 60 can be prevented.

Further, when the aforementioned force is applied to the arm 24, the force is applied to the cover 38 via the holder 36. The force is applied to the cover 38 in a direction along which the cover 38 is detached from the holder 36. Since the cover 38 is fixed to the holder 36 by the second snap fit structures 68, the force is applied to the second snap fit structures 68 in this case. If the second snap fit structures 68 are detached, the cover 38 is detached from the holder 36 and the restricting wall 71 moves from the positions facing the support portions 60a, 60b. In this case, deformation of the support portions 60a, 60b cannot be restricted by the restricting wall 71. However, the second snap fit structures 68 are not in direct contact with the arm 24 and are arranged at positions separated from the arm 24. Due to this, the force applied to the second snap fit structures 68 is small. Therefore, detachment of the second snap fit structures 68 can be prevented.

As described above, in the liquid fuel level sensing device 20 of the present embodiment, both of the first snap fit structures 60 and the second snap fit structures 68 are less likely to be detached, by which the detachment of the arm 24 from the holder 36 can be prevented. Further, by fixing the arm 24, the holder 36, and the cover 38 to each other with the first snap fit structures 60 and the second snap fit structures 68 as above, assembly of the liquid fuel level sensing device 20 can be facilitated. Thus, the liquid fuel level sensing device 20 can be manufactured efficiently.

Further, in the liquid fuel level sensing device 20 of the present embodiment, the cover 38 is provided with the through holes 70 and deformation of the support portions 60a, 60b is restricted by the restricting wall 71 extending along the through holes 70. In other words, inner surfaces of the through holes 70 function as members that restrict deformation of the support portions 60a, 60b. According to this configuration, the support portions 60a, 60b can be seen through the through holes 70 from outside when the cover 38 is attached to the holder 36. Therefore, the cover 38 can be easily attached to the holder 36.

The liquid fuel level sensing device 20 of the embodiment has been described above. In the embodiment above, the base end of the arm 24 is bent in the L-shape, however, a shape of the base end of the arm 24 may be any arbitrary shape.

Further, in the embodiment above, both of the support portions 60a 60b are flexible in each of the first snap fir structures 60. However, only one of the support portions 60a, 60b may be flexible, and the other thereof may not be flexible. In this case, only for the flexible support portion, a portion that restricts deformation thereof (for example, the restricting wall 71) may be provided on the cover 38. Further, only one of the support portions 60a, 60b may be provided with the hook.

While specific examples of the present invention have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present invention is not limited to the combinations described at the time the claims are filed. Further, the purpose of the examples illustrated by the present description or drawings is to satisfy multiple objectives simultaneously, and satisfying any one of those objectives gives technical utility to the present invention.

The invention claimed is:

1. A liquid fuel level sensing device configured to sense a level of liquid fuel in a fuel tank, the fuel level sensing device comprising:
    a body configured to be fixed in the fuel tank;
    a holder rotatably supported by the body;
    an arm fixed to the holder;
    a cover detachably fixed to the holder so as to cover the arm; and
    a float connected to the arm outside the holder,
    wherein
    the holder comprises a bottom portion and a first snap fit structure,
    the first snap fit structure comprises a pair of support portions provided with an interval therebetween, the pair of support portions being provided on the bottom portion,
    a first interval portion and a second interval portion are provided between the pair of support portions, the first interval portion holding the arm, the second interval portion being provided above the first interval portion, and the second interval portion being narrower than a width of the arm held in the first interval portion, and
    the cover comprises a deformation restricting portion provided at a position facing an outer surface of at least one of the pair of support portions.

2. The liquid fuel level sensing device of claim 1, wherein the cover comprises a through hole, and the first snap fit structure is inserted in the through hole.

3. The liquid fuel level sensing device of claim 1, wherein the cover and the holder comprise a second snap fit structure configured to fix the cover and the holder to each other.

4. The liquid fuel level sensing device of claim 1, wherein the at least one of the pair of support portions is sandwiched between the arm and the deformation restricting portion.

5. The liquid fuel level sensing device of claim 1, wherein when the at least one of the pair of support portions is deformed in a direction expanding the second interval portion, the at least one of the support portions comes to contact the deformation restricting portion.

6. The liquid fuel level sensing device of claim 1, wherein the deformation restricting portion restricts the deformation of the at least one of the pair of support portions.

* * * * *